(12) United States Patent
Huang et al.

(10) Patent No.: US 9,122,069 B2
(45) Date of Patent: Sep. 1, 2015

(54) 2D/3D POLARIZED DISPLAY METHOD AND DEVICE

(71) Applicant: Hisense Hiview Tech Co., Ltd., Shandong (CN)

(72) Inventors: Shunming Huang, Shadong (CN); Aichen Xu, Shandong (CN); Jianwei Cao, Shandong (CN); Weidong Liu, Shandong (CN)

(73) Assignee: Hisense Hiview Tech Co., Ltd. (CN)

( * ) Notice: Subject to any disclaimer, the term of this patent is extended or adjusted under 35 U.S.C. 154(b) by 275 days.

(21) Appl. No.: 13/943,926

(22) Filed: Jul. 17, 2013

(65) Prior Publication Data

US 2014/0118340 A1    May 1, 2014

(51) Int. Cl.
*G02B 27/26* (2006.01)
*H04N 13/00* (2006.01)
*H04N 13/04* (2006.01)

(52) U.S. Cl.
CPC .......... *G02B 27/26* (2013.01); *H04N 13/0029* (2013.01); *H04N 13/0434* (2013.01); *H04N 13/0438* (2013.01); *H04N 13/0452* (2013.01)

(58) Field of Classification Search
None
See application file for complete search history.

*Primary Examiner* — Mark Zimmerman
*Assistant Examiner* — Vu Nguyen
(74) *Attorney, Agent, or Firm* — DLA Piper LLP (US)

(57) ABSTRACT

The invention proposes a novel 2D/3D polarized display method, polarized display device and a 2D/3D television, applied to the polarization 3D technology; through compensation calculation on the original left-eye and right-eye image signals and alternate time domain display of the images, and through the addition of information on the compensation images in time and space, and in cooperation with control of the opening and closing of the polarization 3D glasses, while viewers wearing the polarization 3D glasses can experience good 3D effect, other viewers with naked eyes can view clear 2D images, so that the 3D viewers and the 2D viewers do not affect each other.

19 Claims, 7 Drawing Sheets

--Prior Art--

Receiving a frame of 3D image signals with a first frame frequency, wherein the 3D image signals include a left-eye image signal and a right-eye image signal ⎯ S11

Performing frequency doubling to compensate the frame of 3D image signals with the first frame frequency, to generate a frame of the left-eye image compensation signals with a second frame frequency and a frame of right-eye image compensation signals with the second frame frequency, wherein the frame of left-eye image compensation signals include the left-eye image signal and a first image compensation signal, and the frame of right-eye image compensation signals include the right-eye image signal and a second image compensation signal ⎯ S12

During displaying the first frame image, displaying on the polarized display device left-eye image compensation images based on the left-eye image compensation signals, wherein the left-eye image based on the left-eye image signal is displayed on the N first rows of the polarized display device, and the first compensation image based on the first image compensation signal is displayed on the M second rows of the polarized display device; and controlling the polarization 3D glasses to open the left-eye polarized lens and close the right-eye polarized lens ⎯ S13a During displaying a second frame image, displaying on the polarized display device right-eye image compensation images based on the right-eye image compensation signals, wherein the second compensation image based on the second image compensation signal is displayed on the N first rows of the polarized display device, and the right-eye image based on the right-eye image signal is displayed on the M second rows of the polarized display device; and controlling the polarization 3D glasses to close the left-eye polarized lens and open the right-eye polarized lens, wherein the display cumulative effect of the left-eye compensation images and the right-eye compensation images is the display effect of the left-eye image or the right-eye image ⎯ S13b

Fig. 2

2D/3D POLARIZED DISPLAY METHOD AND DEVICE

The present application claims priority to Chinese Patent Application No. 201210424536.7, filed with the State Intellectual Property Office of China on Oct. 30, 2012 and entitled "2D/3D POLARIZED DISPLAY METHOD, DEVICE AND TELEVISION", which is hereby incorporated by reference in its entirety.

FIELD OF THE INVENTION

The invention relates to the field of display technology, and in particular to a 2D/3D polarized display method, a 2D/3D polarized display device and a 2D/3D television.

BACKGROUND OF THE INVENTION

With the development of 3D display technologies, people can enjoy 3D high definition video without going outside. Polarization 3D display technology is one of the currently widely applied 3D display technologies.

FIG. 1 is a schematic diagram of the principle of the existing polarization 3D display technology, and as shown in FIG. 1, a polarization 3D display device 10 generally includes a display screen 11 and polarized glasses 12, wherein a polarizing film 111 is adhered to the display screen 11. Odd-row (or even-row) pixels of the display screen 11 serve as left-eye pixels 11a, and even-row (or odd-row) pixels of the display screen 11 serve as right-eye pixels 11b, and correspondingly, odd rows (or even rows) output a left-eye image, and even rows (or odd rows) output a right-eye image; after light rays of the display screen 11 pass through the polarizing film 111 with different polarization characteristics (polarization directions), for example, a quarter-wavelength phase retarder, the light rays of the left-eye pixels form left circularly polarized light, and the light rays of the right-eye pixels form right circularly polarized light; and a viewer wears circularly polarized glasses 12 whose left and right spectacle lenses have different polarization characteristics (polarization directions), for example, the left spectacle lens is a left circularly polarized lens, and the right spectacle lens is a right circularly polarized lens, so that the left eye of the viewer can only see pictures displayed by the left-eye pixels, and the right eye can only see pictures displayed by the right-eye pixels, that is to say, the left and right eyes of the viewer receive 2 groups of different pictures which are displayed interlacedly, which are then synthesized into a stereo image by the brain.

However, the applicant discovers, in the process of implementing the technical solution in the embodiments of the application, the following facts about the above polarization 3D display technology in the prior art.

When using the 3D display device based on the above polarization 3D technology, the viewer wearing the polarization 3D glasses can see 3D images, but if the viewer directly views the display screen without wearing the glasses, as pictures delivered by the display screen simultaneously include the left-eye image and the right-eye image, the viewer can only see blurry pictures with double-images. That is to say, when a viewer is viewing the pictures with the polarization 3D glasses in a 3D mode, other viewers cannot directly view clear screen pictures with naked eyes. In addition, as long-time viewing of 3D pictures is likely to cause viewers to feel uncomfortable, if a viewer want to exit the 3D mode and select a 2D mode, other viewers who are viewing in the 3D mode at that time will inevitably be affected, and thus it cannot achieve the effect that different viewers respectively view 3D and 2D pictures at the same time with the same display device.

SUMMARY OF THE INVENTION

In view of the foregoing facts, the embodiments of the invention provide a 2D/3D polarized display method and polarized display device and a 2D/3D television that can overcome the above facts.

An embodiment of the invention proposes a 2D/3D polarized display method for a 2D/3D polarized display device, wherein the polarized display device includes N first rows with a first polarization characteristic and M second rows with a second polarization characteristic, and the first rows and the second rows are arranged alternately, the polarized display device further includes polarization 3D glasses, the polarization 3D glasses include a left-eye polarized lens for receiving images displayed on the N first rows of the polarized display device and a right-eye polarized lens for receiving images displayed on the M second rows of the polarized display device, wherein N and M are nature number; the method includes: receiving a frame of 3D image signals with a first frame frequency, wherein the 3D image signals include a left-eye image signal and a right-eye image signal; performing frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal; during displaying a first frame image, displaying on the polarized display device the left-eye compensation images based on the compensated left-eye image signals, wherein a left-eye image based on the left-eye image signal is displayed on the N first rows of the polarized display device, and a first compensation image based on the first image compensation signal is displayed on the M second rows of the polarized display device, and controlling the polarization 3D glasses to open the left-eye polarized lens and close the right-eye polarized lens; and during displaying a second frame image, displaying on the polarized display device right-eye compensation images based on the compensated right-eye image signals, wherein a second compensation image based on the second image compensation signal is displayed on the N first rows of the polarized display device, and a right-eye image based on the right-eye image signal is displayed on the M second rows of the polarized display device, and controlling the polarization 3D glasses to close the left-eye polarized lens and open the right-eye polarized lens, wherein the display cumulative effect of the left-eye compensation images and the right-eye compensation images is the display effect of the left-eye image or the right-eye image.

An embodiment of the invention proposes a 2D/3D polarized display device, wherein the polarized display device comprises N first rows with a first polarization characteristic and M second rows with a second polarization characteristic, and the first rows and the second rows are arranged alternately, the polarized display device further includes polarization 3D glasses, the polarization 3D glasses include a left-eye polarized lens for receiving images displayed on the N first rows of the polarized display device and a right-eye polarized lens for receiving images displayed on the M second rows of the polarized display device, wherein N and M are nature number, the 2D/3D polarized display device further includes an image reception module, a frequency doubling compensation processing module, a time domain control display module, a glasses control signal output module and a glasses control signal reception module; the image reception module is configured to receive a frame of 3D image signals with a first frame frequency, wherein the 3D image signals include a left-eye image signal and a right-eye image signal; the frequency doubling compensation processing module is configured to perform frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal; the time domain control display module is configured to display on the polarized display device left-eye compensation images based on the compensated left-eye image signals during displaying a first frame image, wherein a left-eye image based on the left-eye image signal is displayed on the N first rows of the polarized display device, and a first compensation image based on the first image compensation signal is displayed on the M second rows of the polarized display device; and to display on the polarized display device the right-eye compensation images based on the compensated right-eye image signals during displaying a second frame image, wherein a second compensation image based on the second image compensation signal is displayed on the N first rows of the polarized display device, and a right-eye image based on the right-eye image signal is displayed on the M second rows of the polarized display device, wherein the display cumulative effect of the left-eye compensation images and the right-eye compensation images is the display effect of the left-eye image or the right-eye image; the glasses control signal output module is configured to transmit a first control signal to control the polarization 3D glasses to open the left-eye polarized lens and close the right-eye polarized lens during displaying the first frame image, and to transmit a second control signal to control the polarization 3D glasses to close the left-eye polarized lens and open the right-eye polarized lens during displaying the second frame image; and the spectacle control signal reception module is disposed on the polarization 3D glasses and is configured to receive the control signals output by the glasses control signal output module.

To achieve the above object, the invention also proposes a 2D/3D television which includes the above 2D/3D polarized display device.

Compared with the prior art, the polarized display method, the polarized display device and the 2D/3D television provided in the invention have the following characteristics.

Firstly, according to an embodiment of the invention, frequency doubling is performed to compensate the 3D image signals including the left-eye image signal and the right-eye image signal, to generate the second image signals with the second frame frequency, wherein the second image signals include the compensated left-eye image signals and the compensated right-eye image signals, the compensated left-eye image signals include the left-eye image signal and the first image compensation signal, and the compensated right-eye image signals include the right-eye image signal and the second image compensation signal. During displaying the first frame image, the left-eye image based on the left-eye image signal and the first compensation image based on the first image compensation signal are displayed in an interlaced manner; and during displaying the second frame image, the second compensation image based on the second image compensation signal and the right-eye image based on the right-eye image signal are displayed in an interlaced manner, and the display cumulative effect of the left-eye compensation images and the right-eye compensation images is the display effect of the left-eye image or the right-eye image. When a user is viewing with the polarization 3D glasses, in a time period when the left-eye compensation images are displayed, the left-eye polarized lens of the 3D glasses is open and receives the left-eye image, and the right-eye polarized lens is closed and shields the first compensation image; and in a time period when the right-eye compensation images are displayed, the left-eye polarized lens of the 3D glasses is closed and shields the second compensation image, and the right-eye polarized lens is open and receives the right-eye image; and the 3D glasses receive the left-eye image and the right-eye image alternately, thereby forming a 3D image in the brain. When not wearing the 3D glasses, the user can see cumulative effect of continuous images, and according to the invention, the display cumulative effect of the left-eye compensation images and the right-eye compensation images is the display effect of the left-eye image or the right-eye image, and thus the display effect the user can see is continuous picture effect of the left-eye images or the right-eye images, which solves the double-image phenomenon resulting from the alternate accumulative effect of the left-eye images and the right-eye images in the prior art, and produces a good 2D image display effect.

Secondly, since it is achieved in the invention that when the user is not wearing the 3D glasses, the display effect he can see is continuous picture effect of the left-eye images or the right-eye images, and the double-image phenomenon is avoided and a good 2D image display effect is realized, then the technical problem that user can see the double-image phenomenon when viewing with naked eyes is solved, and 2D and 3D simultaneous compatible display is realized, and the object that different users and groups can view 2D and 3D images at the same time is achieved.

Thirdly, since 2D and 3D simultaneous compatible display is achieved in the invention, with respect to the same viewing user, changing between 3D and 2D can be conducted at will, and thus switching between 3D and 2D display modes is avoided, for example, when a user feels tired after viewing the 3D pictures for a long time, he can take off the 3D glasses and view the 2D pictures directly.

The above description is only a summary of the technical solution of the invention, and in order to more clearly understand the technical means of the invention so as to implement the same according to the content of the description, and in order to make the above and other objects, features and advantages more apparent and easy to understand, embodiments will be set forth below and described in detail in conjunction with drawings.

BRIEF DESCRIPTION OF THE DRAWINGS

FIG. 2 is a schematic flow chart of a 2D/3D polarized display method according to the first embodiment of the invention.

DETAILED DESCRIPTION OF THE EMBODIMENTS

Figure 1:
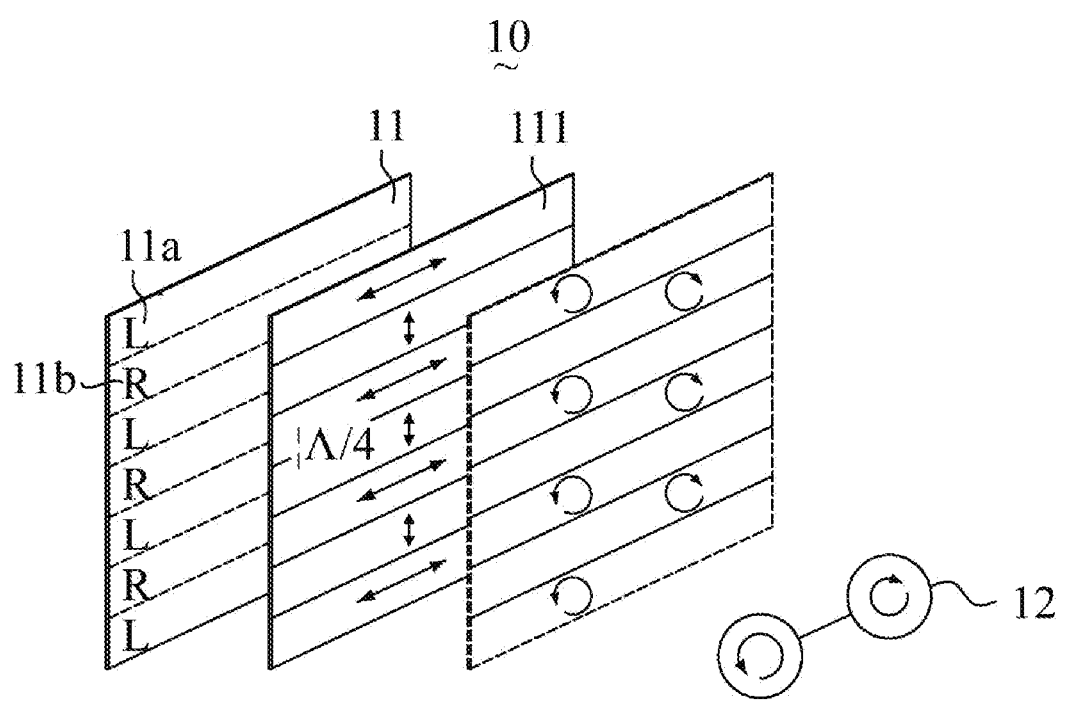
FIG. 1 is a schematic diagram of the principle of the existing polarization 3D display technology.

To further discuss the technical means adopted in the invention to achieve the predetermined object and the efficacy thereof, the specific implementations, structure, features and efficacy of the 2D/3D polarized display device and display method proposed according to the invention will be described in detail below in conjunction with the drawings and preferred embodiments.

The above and other technical contents, features and efficacy about the invention will be clearly presented in the detailed description of the preferred embodiments in conjunction with the reference diagrams. The technical means adopted in the invention to achieve the predetermined object and the efficacy thereof can be more deeply and particularly understood through the description of the specific implementations; however, the accompanying drawings are only used for providing reference and illustration and are not used for limiting the invention.

An embodiment of the invention proposes a novel 2D/3D polarized display method and a 2D/3D polarized display device applied to the polarization 3D technology; through compensation calculation on the original left-eye and right-eye image signals and alternate time domain display of the images, and through compensating images in time and space, and in cooperation with control of the opening and closing of the polarization 3D glasses, while viewers wearing the polarization 3D glasses can experience good 3D effect, other viewers with naked eyes can view clear 2D images, so that the 3D viewers and the 2D viewers do not affect each other. Furthermore, it is to be noted that in the prior art, as known by those skilled in the art, the implementation of the polarization 3D display technology is the left-eye lens and the right-eye lens of the polarization 3D glasses simultaneously receive the left-eye and right-eye images with different polarization characteristics, displayed on alternate rows, in a frame of image picture, and no shutter switch is arranged in the polarization 3D glasses; while in the technical solution provided by the embodiment of the invention, which breaks the customary way of thinking in the prior art, a technical means of controlling the opening and closing of the polarization 3D glasses (e.g. adopting a shutter switch) in cooperation with image display time sequence is adopted in the polarization 3D display technology, moreover, a group of 3D images are implemented in two frames of images in the embodiment of the invention, wherein one frame is left-eye compensation images, and the other frame is right-eye compensation images. In addition, the display content of the two frames of images is improved, for example, as to a frame of left-eye compensation images, a left-eye image is displayed on odd rows, and a compensation image is displayed on even rows, and the compensation image is not necessarily a right-eye image or not necessarily a left-eye image; and as to a frame of right-eye compensation images, another compensation image is displayed on odd rows, and the compensation image is not necessarily a right-eye image or not necessarily a left-eye image, and a right-eye image is displayed on even rows; this is totally different from the processing way of displaying the left-eye image and the right-eye image respectively on alternate rows of one frame of images in the conventional polarization 3D display technology, and even more different from the shutter 3D display way; and thus an unexpected technical effect can be achieved, that is, while the 3D display is achieved, viewers not wearing the glasses can also see a 2D display image without double-image phenomenon, so that the viewing pattern of the 3D viewers and the viewing pattern of the 2D viewers do not affect each other.

First Embodiment

Figure 3:
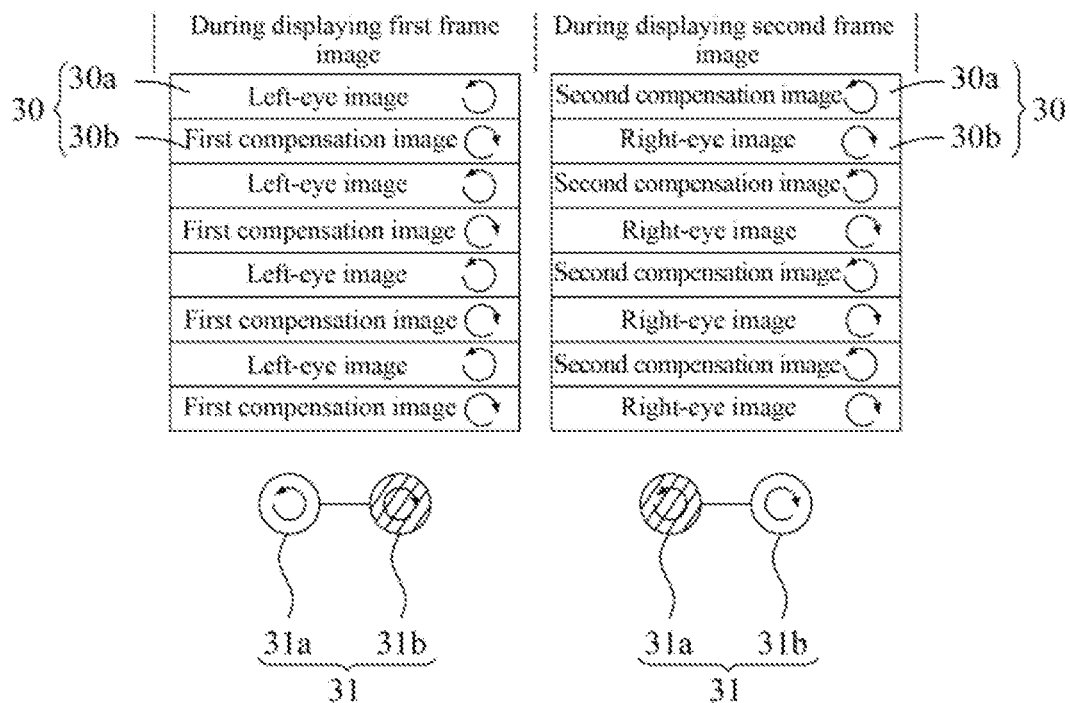
FIG. 3 is a schematic diagram of the principle of the 2D/3D polarized display method according to the first embodiment of the invention.
Figure 4:
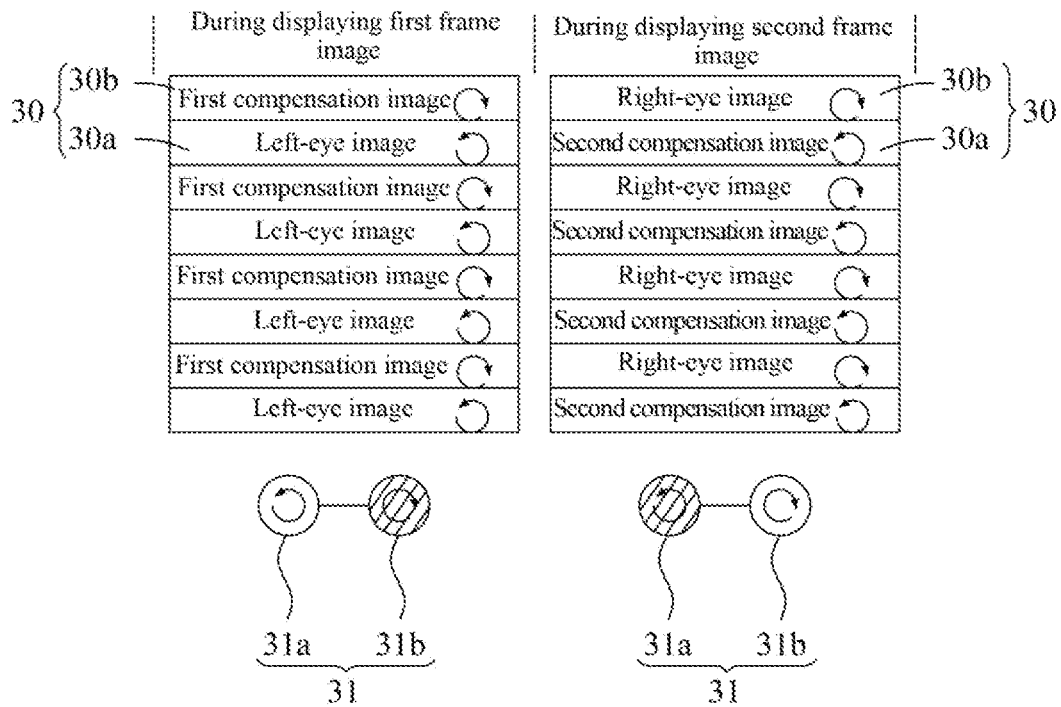
FIG. 4 is another schematic diagram of the principle of the 2D/3D polarized display method according to the first embodiment of the invention.

FIG. 2 is a schematic flow chart of a 2D/3D polarized display method according to the first embodiment of the invention; FIG. 3 is a schematic diagram of the principle of the 2D/3D polarized display method according to the first embodiment of the invention; and FIG. 4 is another schematic diagram of the principle of the 2D/3D polarized display method according to the first embodiment of the invention.

The 2D/3D polarized display method according to the embodiment is used for a 2D/3D polarized display device 30 (please refer to FIG. 3), wherein the polarized display device 30 includes N first rows 30a with a first polarization characteristic and M second rows 30b with a second polarization characteristic, and the first rows 30a and the second rows 30b are arranged alternately, wherein N and M are natural number, and N and M can be either the same or different. The polarized display device 30 also includes polarization 3D glasses 31, the polarization 3D glasses 31 includes a left-eye polarized lens 31a for receiving images displayed on the N first rows 30a of the polarized display device and a right-eye polarized lens 31b for receiving images displayed on the M second rows 30b of the polarized display device. In the invention, as shown in FIG. 3, the N first rows 30a corresponds to the odd rows of the polarized display device, and the M second rows 30b corresponds to the even rows of the polarized display device, and it can also be the case that as shown in FIG. 4, the N first rows 30a corresponds to the even rows of the polarized display device, and the M second rows 30b corresponds to the odd rows of the polarized display device, but the invention is not limited to it.

Specifically, please refer to FIG. 2, in the embodiment, the 2D/3D polarized display method includes the following steps.

Step S11: receiving a frame of 3D image signals with a first frame frequency, wherein the 3D image signals include a left-eye image signal and a right-eye image signal.

In this embodiment, the first frame frequency is for example 60 Hz or 120 Hz, and certainly, the first frame frequency can also be 50 Hz or 100 Hz, but the invention is not limited to it. The 3D image signals, that is, 3D image signal source, can be input via a network, and can also be input via a storage device interface.

Step S12: performing frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal.

In this step, frequency doubling is performed on the received frame of 3D image signals with the first frame frequency. In the embodiment, description is made with the first frame frequency of 60 Hz of the 3D image signals as an example. After frequency doubling processing, the frame of 3D image signals are changed into a frame of compensated left-eye image signals and a frame of compensated right-eye image signals. The second frame frequency of the compensated left-eye image signals and the compensated right-eye image signals is 120 Hz. Certainly, if the first frame frequency of the 3D image signals is 120 Hz, the second frame frequency of the compensated left-eye image signals and the compensated right-eye image signals is changed to 240 Hz. In the embodiment, description is made with the first frame frequency of 60 Hz and the second frame frequency of 120 Hz only as an example, but it is not limited to this.

Step S12 can specifically include: obtaining the first image compensation signal included in the compensated left-eye image signals and the second image compensation signal included in the compensated right-eye image signals, according to the left-eye image signal and the right-eye image signal.

Specifically, processing can be performed on data of the left-eye image signal and data of the right-eye image signal based on the formula $C1+C2+L+R=aL$ or $C1+C2+L+R=aR$, to obtain data of the first image compensation signal or data of the second image compensation signal, wherein L is display signal data corresponding to the ith pixel point of the left-eye image signal, and R is display signal data corresponding to the ith pixel point of the right-eye image signal; C1 is display signal data corresponding to the ith pixel point of the first image compensation signal, and C2 is display signal data corresponding to the ith pixel point of the second image compensation signal; and a is larger than 0, and i is a positive integer larger than or equal to 1.

When the data of the left-eye image signal and the data of the right-eye image signal are processed based on the formula $C1+C2+L+R=aL$, it can be obtained that the display signal data C1 corresponding to the ith pixel point of the first image compensation signal is $(a-2)L-R$, and the display signal data C2 corresponding to the ith pixel point of the second image compensation signal is L; or it can be obtained that the display signal data C1 corresponding to the ith pixel point of the first image compensation signal is L, and the display signal data C2 corresponding to the ith pixel point of the second image compensation signal is $(a-2)L-R$. Preferably, to simplify the calculation, the display signal data C1 corresponding to the ith pixel point of the first image compensation signal and the display signal data C2 corresponding to the ith pixel point of the second image compensation signal can be set to be the same, and processing is performed on the data of the left-eye image signal and the data of the right-eye image signal, to obtain the data of the first image compensation signal or the data of the second image compensation signal, and in this case, it can be obtained that $C1=C2=((a-1)L-R)/2$. Certainly, other results of the data C1 and C2 can also be obtained from the formula $C1+C2+L+R=aL$, which is omitted herein. Furthermore, when the formula $C1+C2+L+R=aL$ is selected as the basis for processing the data of the left-eye image signal and the data of the right-eye image signal, the display cumulative effect of the left-eye compensation images based on the compensated left-eye image signals and the right-eye compensation images based on the compensated right-eye image signals is the display effect of the left-eye image.

When the data of the left-eye image signal and the data of the right-eye image signal are processed based on the formula $C1+C2+L+R=aR$, it can be obtained that the display signal data C1 corresponding to the ith pixel point of the first image compensation signal is $(a-2)R-L$, and the display signal data C2 corresponding to the ith pixel point of the second image compensation signal is R; or it can be obtained that the display signal data C1 corresponding to the ith pixel point of the first image compensation signal is R, and the display signal data C2 corresponding to the ith pixel point of the second image compensation signal is $(a-2)R-L$. Preferably, to simplify the calculation, the display signal data C1 corresponding to the ith pixel point of the first image compensation signal and the display signal data C2 corresponding to the ith pixel point of the second image compensation signal can also be set to be the same, and processing is performed on the data of the left-eye image signal and the data of the right-eye image signal, to obtain the data of the first image compensation signal or the data of the second image compensation signal, and in this case, it can be obtained that $C1=C2=((a-1)R-L)/2$. Certainly, other results of the data C1 and C2 can also be obtained from the formula $C1+C2+L+R=aR$, which is omitted herein. Furthermore, when the formula $C1+C2+L+R=aR$ is selected as the basis for processing on the data of the left-eye image signal and the data of the right-eye image signal, the display cumulative effect of the left-eye compensation images based on the compensated left-eye image signals and the right-eye compensation images based on the compensated right-eye image signals is the display effect of the right-eye image.

It is to be noted that the value of a can only affect the brightness of the viewed picture, preferably, $a=4$, as the brightness of the original picture is not changed in the case of $a=4$, but the invention is not limited to the case of $a=4$, as when $a<4$ or $a>4$, a viewer can also see the whole 2D picture, only with relatively lower or higher brightness of the picture, but the brightness can be regulated through backlight. Theoretically, a can be selected to be larger than 4, but when a is selected to be larger than 4, the brightness of a displayed 2D image is relatively easy to saturate.

When a is designed to be 4, the display cumulative effect of the left-eye compensation images and the right-eye compensation images is the effect of displaying 4 frames of images of the left-eye images or the right-eye images, that is to say, based on the formula $C1+C2+L+R=4L$, processing is performed on the data of the left-eye image signal and the data of the right-eye image signal, to obtain the data of the first image compensation signal or the data of the second image compensation signal, so that the display cumulative effect of the left-eye compensation images based on the compensated left-eye image signals and the right-eye compensation images based on the compensated right-eye image signals can be the display effect of 4 frames of left-eye images; and based on the formula $C1+C2+L+R=4R$, processing is performed on the data of the left-eye image signal and the data of the right-eye image signal, to obtain the data of the first image compensation signal or the data of the second image compensation signal, so that the display cumulative effect of the left-eye compensation images based on the compensated left-eye image signals and the right-eye compensation images based on the compensated right-eye image signals can be the display effect of 4 frames of right-eye images. The brightness of the display cumulative effect of the left-eye compensation images and the right-eye compensation images obtained on this condition does not need to be additionally compensated or regulated.

Step S13a: during displaying a first frame image, displaying on the polarized display device left-eye compensation images based on the compensated left-eye image signals, wherein the left-eye image based on the left-eye image signal is displayed on the N first rows of the polarized display device, and the first compensation image based on the first image compensation signal is displayed on the M second rows of the polarized display device; and controlling the polarization 3D glasses to open the left-eye polarized lens and close the right-eye polarized lens.

Step S13b: during displaying a second frame image, displaying on the polarized display device the right-eye compensation images based on the compensated right-eye image signals, wherein the second compensation image based on the second image compensation signal is displayed on the N first rows of the polarized display device, and the right-eye image based on the right-eye image signal is displayed on the M second rows of the polarized display device; and controlling the polarization 3D glasses to close the left-eye polarized lens and open the right-eye polarized lens, wherein the display cumulative effect of the left-eye compensation images and the right-eye compensation images is the display effect of the left-eye image or the right-eye image.

Specifically, please refer to FIG. 3, if the N first rows 30a correspond to the odd rows of the polarized display device, and the M second rows 30b correspond to the even rows of the polarized display device, then during displaying the first frame image, the left-eye image is displayed on the odd rows of the polarized display device 30, and the first compensation image is displayed on the even rows of the polarized display device 30; and during displaying the second frame image, the second compensation image is displayed on the odd rows of the polarized display device 30, and the right-eye image is displayed on the even rows of the polarized display device 30.

Please refer to FIG. 4, if the N first rows 30a correspond to the even rows of the polarized display device 30, and the M second rows 30b correspond to the odd rows of the polarized display device 30, then during displaying the first frame image, the first compensation image is displayed on the odd rows of the polarized display device 30, and the left-eye image is displayed on the even rows of the polarized display device 30; and during displaying the second frame image, the right-eye image is displayed on the odd rows of the polarized display device 30, and the second compensation image is displayed on the even rows of the polarized display device 30.

The left and right polarized lenses of the polarization 3D glasses 31 can be designed according to the first polarization characteristic of the N first rows 30a and the second polarization characteristic of the M second rows 30b of the polarized display device 30. Suppose the left-eye image displayed on the N first rows 30a is a left (or right) circularly polarized image, and the first compensation image displayed on the M second rows 30b is a right (or left) circularly polarized image, then the left-eye polarized lens 31a can be correspondingly designed to be a left (or right) circularly polarized lens, and the right-eye polarized lens 31b can be correspondingly designed to be a right (or left) circularly polarized lens. Suppose the left-eye image is a horizontal (or vertical) line polarized image, and the first compensation image is a vertical (or horizontal) line polarized image, then the left-eye polarized lens 31a can be correspondingly designed to be a horizontal (or vertical) line polarized lens, and the right-eye polarized lens 31b can be correspondingly designed to be a vertical (or horizontal) line polarized lens.

During displaying the first frame image, the polarization 3D glasses 31 can be controlled to open the left-eye polarized lens 31a to receive the left-eye image and close the right-eye polarized lens 31b to shield the first compensation image through outputting a first glasses control signal. During displaying the second frame image, the polarization 3D glasses 31 can be controlled to close the left-eye polarized lens 31a to shield the second compensation image and open the right-eye polarized lens 31b to receive the right-eye image through outputting a second glasses control signal. The first glasses control signal and the second glasses control signal can be transferred to the polarization 3D glasses 31 via a wireless signal, such as an infrared or Bluetooth signal. The polarization 3D glasses 31 can adopt a liquid crystal shutter to control the opening and closing of the left and right polarized lenses, for example, the liquid crystal shutter can be added to the existing polarization 3D glasses 31, and certainly other existing control methods can also be adopted to control the opening and closing of the left and right polarized lenses, but the invention is not limited to it.

Please refer to FIGS. 3 and 4, when a viewer uses the polarization 3D glasses 31 to view the 3D images, during displaying the first frame image, the left-eye polarized lens 31a is opened to receive the left-eye image and the right-eye polarized lens 31b is closed to shield the first compensation image. During displaying the second frame image, the left-eye polarized lens 31a is closed to shield the second compensation image and the right-eye polarized lens 31b is opened to receive the right-eye image, thus the left and right eyes of the viewer can see corresponding pictures at proper moments, thereby ensuring that the viewer sees continuous and flicker-free 3D image effect.

Furthermore, in the invention, the display cumulative effect of the left-eye compensation images and the right-eye compensation images is the display effect of the left-eye image or the right-eye image. In the case of not wearing the glasses, i.e., in the case of naked eyes, according to the integration effect of viewing images by human eyes in time and space, the compensation images effectively reduce the double-image phenomenon of left-eye and right-eye pictures seen with naked eyes in the 3D mode, and only the left-eye image or right-eye image of the picture is seen, that is, clear 2D pictures are seen by a viewer with naked eyes.

Furthermore, it is to be noted that the content displayed during displaying the first frame image and that displayed during displaying the second frame image can be exchanged, which can be achieved merely by correspondingly exchanging the switching time sequence of the polarization 3D glasses, that is to say, during displaying the first frame image, the right-eye compensation images based on the compensated right-eye image signals can be displayed on the polarized display device, and the polarization 3D glasses are controlled to open the right-eye polarized lens and close the left-eye polarized lens; and during displaying the second frame image, the left-eye compensation images based on the compensated left-eye image signals can be displayed on the polarized display device, and the polarization 3D glasses are controlled to close the right-eye polarized lens and open the left-eye polarized lens, and the display cumulative effect of the left-eye compensation images and the right-eye compensation images is also the display effect of the left-eye image or the right-eye image.

Second Embodiment

Figure 5:
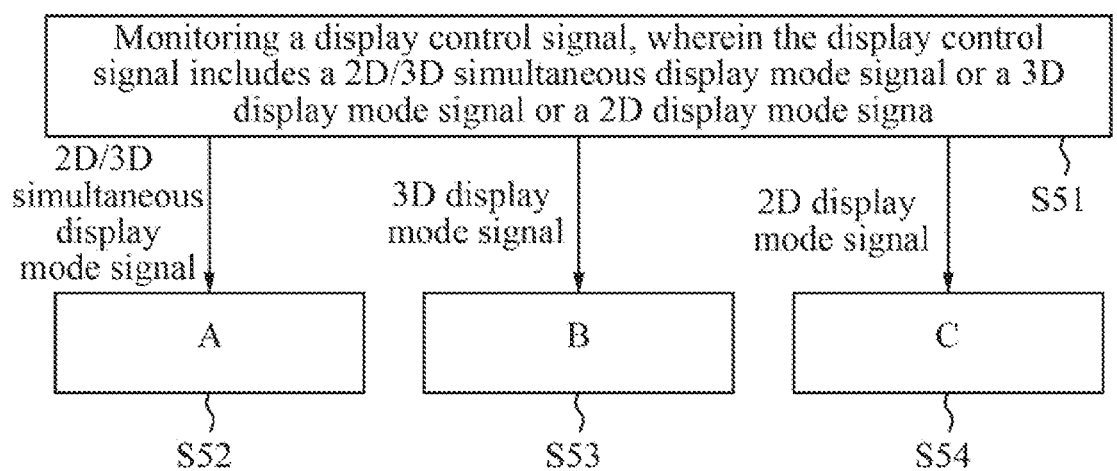
FIG. 5 is a schematic flow chart of a 2D/3D polarized display method according to the second embodiment of the invention.

FIG. 5 is a schematic flow chart of a 2D/3D polarized display method according to a second embodiment of the invention. Please refer to FIG. 5. The 2D/3D polarized display method according to the embodiment is used for a 2D/3D polarized display device, and the 2D/3D polarized display device at least includes a 2D/3D simultaneous display mode and a 3D display mode, or the 2D/3D simultaneous display mode and a 2D display mode, and certainly can simultaneously include the 3D mode, the 2D/3D simultaneous display mode and the 2D display mode. Specifically, please refer to FIG. 5, in the embodiment, the 2D/3D polarized display method includes the following steps.

Step S51: monitoring a display control signal, wherein the display control signal includes a 2D/3D simultaneous display mode signal, a 3D display mode signal or a 2D display mode signal.

The display control signal is generally sent by a user via a selection button on a remote control equipment or a display device; and the 2D/3D simultaneous display mode signal corresponds to the 2D/3D simultaneous display mode, the 3D display mode signal corresponds to the 3D display mode, and the 2D display mode signal corresponds to the 2D display mode.

If the monitored display control signal is the 2D/3D simultaneous display mode signal, step S52 (represented as A in FIG. 5) is performed, and step S52 is the same as the step in the first embodiment and is omitted herein.

Figure 6:
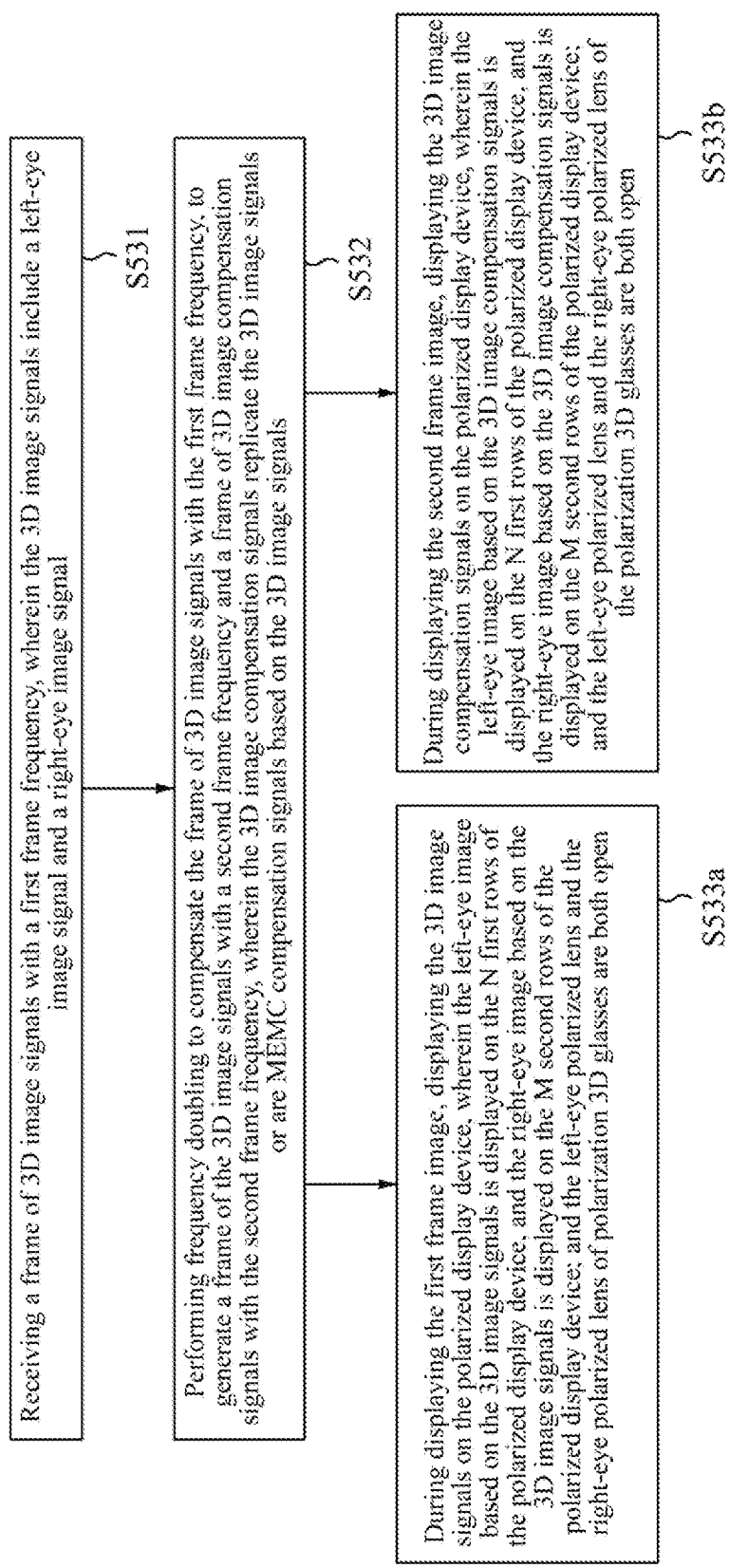
FIG. 6 is a detailed schematic diagram of step S53 in FIG. 5.

If the monitored display control signal is the 3D display mode signal, step S53 (represented as B in FIG. 5) shown in FIG. 6 is performed:

Step S531: receiving a frame of 3D image signals with a first frame frequency, wherein the 3D image signals include a left-eye image signal and a right-eye image signal.

Step S532: performing frequency doubling to compensate the frame of 3D image signals with the first frame frequency, to generate a frame of the 3D image signals with a second frame frequency and a frame of 3D image compensation signals with the second frame frequency, wherein the 3D image compensation signals replicate the 3D image signals or are MEMC (Motion Estimate and Motion Compensation) compensation signals based on the 3D image signals.

If the 3D image compensation signals are replicates of the 3D image signals, the 3D image compensation signals also correspondingly include the left-eye image signal and the right-eye image signal. If the 3D image compensation signals are MEMC compensation signals based on the 3D image signals, the 3D image compensation signals include an MEMC compensation signal of the left-eye image signal and an MEMC compensation signal of the right-eye image signal.

Step S533a: during displaying a first frame image, displaying the 3D image signals on the polarized display device, wherein the left-eye image based on the 3D image signals is displayed on the N first rows of the polarized display device, and the right-eye image based on the 3D image signals is displayed on the M second rows of the polarized display device; and controlling the left-eye polarized lens and the right-eye polarized lens of the polarization 3D glasses to open.

That is to say, during displaying the first frame image, the left-eye image based on the left-eye image signal in the 3D image signals is displayed on the N first rows of the polarized display device, and the right-eye image based on the right-eye image signal in the 3D image signals is displayed on the M second rows of the polarized display device.

Step S533b: during displaying a second frame image, displaying the 3D image compensation signals on the polarized display device, wherein the left-eye image based on the 3D image compensation signals is displayed on the N first rows of the polarized display device, and the right-eye image based on the 3D image compensation signals is displayed on the M second rows of the polarized display device; and controlling the left-eye polarized lens and the right-eye polarized lens of the polarization 3D glasses to open.

If the 3D image compensation signals are replicates of the 3D image signals, then during displaying the second frame image, the left-eye image based on the left-eye image signal is displayed on the N first rows of the polarized display device, and the right-eye image based on the right-eye image signal is displayed on the M second rows of the polarized display device. If the 3D image compensation signals are MEMC compensation signals based on the 3D image signals, then during displaying the second frame image, the left-eye image based on the MEMC compensation signal of the left-eye image signal is displayed on the N first rows of the polarized display device, and the right-eye image based on the MEMC compensation signal of right-eye image signal is displayed on the M second rows of the polarized display device.

In the 3D display mode, the left-eye polarized lens and the right-eye polarized lens of the polarization 3D glasses are both open, and the glasses are equivalent to common polarization glasses, and when a viewer is viewing with the glasses, the left-eye polarized lens can receive the left-eye image or the left-eye compensation image, and the right-eye polarized lens can receive the right-eye image or the right-eye compensation image, so that the left and right eyes of a person can receive two groups of pictures which are displayed in an interlaced manner, which are then synthesized into a stereo image in the brain.

Figure 7:
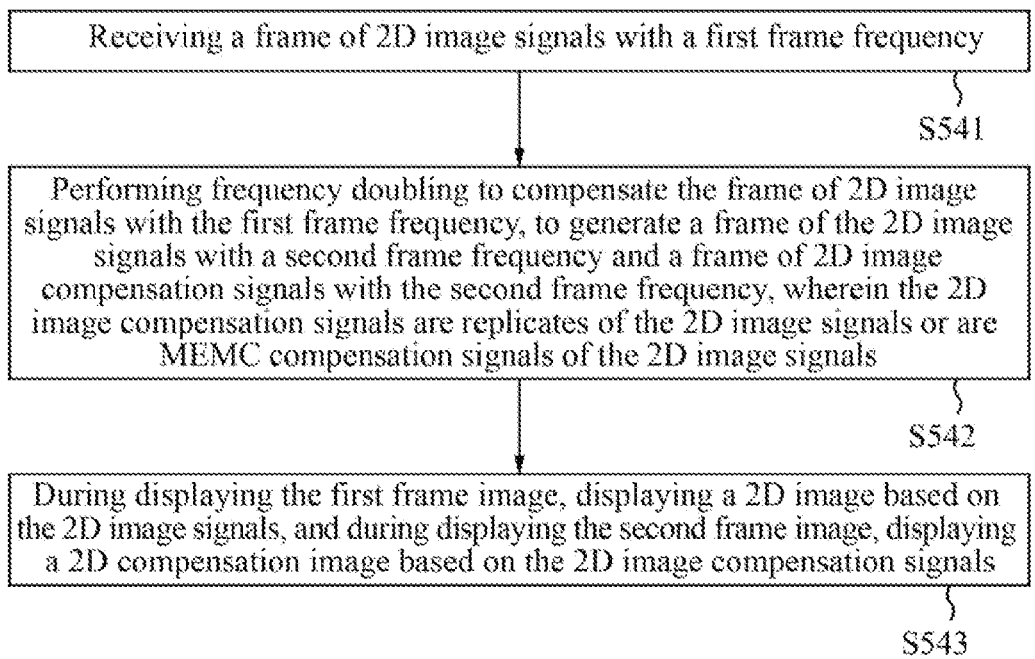
FIG. 7 is a detailed schematic diagram of step S54 in FIG. 5.

If the monitored display control signal is the 2D display mode signal, step S54 (represented as C in FIG. 5) shown in FIG. 7 is performed:

Step S541: receiving a frame of 2D image signals with a first frame frequency.

Step S542: performing frequency doubling to compensate the frame of 2D image signals with the first frame frequency, to generate a frame of 2D image signals with a second frame frequency and a frame of 2D image compensation signals with the second frame frequency, wherein the 2D image compensation signals are replicates of the 2D image signals or are MEMC compensation signals of the 2D image signals.

Step S543: during displaying a first frame image, displaying a 2D image based on the 2D image signals, and during displaying a second frame image, displaying a 2D compensation image based on the 2D image compensation signals.

In the 2D display mode, a viewer with naked eyes can view clear 2D pictures.

Different from the first embodiment, in this embodiment, the 2D/3D polarized display method can realize 3 different kinds of display in 3 different modes. In the 2D/3D simultaneous display mode, through compensation on the original left-eye and right-eye image signals and alternate time domain display of the images, and through the addition of information on the compensation images in time and space, and in cooperation with control of the opening and closing of the polarization 3D glasses, while viewers wearing the polarization 3D glasses can experience good 3D effect, other viewers with naked eyes can view clear 2D images, so that the 3D viewers and the 2D viewers do not affect each other. If the other viewers with naked eyes do not exist, the viewers can also select to view 3D pictures in the 3D display mode. If 3D viewing is not needed, the 2D display mode can also be selected.

Third Embodiment

Figure 8:
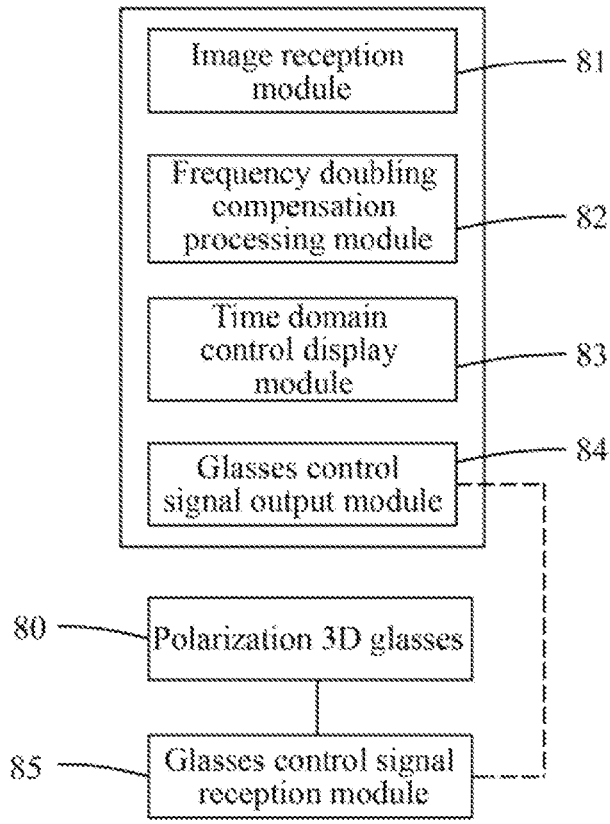
FIG. 8 is a structural schematic diagram of a 2D/3D polarized display device according to the third embodiment of the invention.

FIG. 8 is a structural schematic diagram of a 2D/3D polarized display device according to the third embodiment of the invention. The polarized display device includes N first rows with a first polarization characteristic and M second rows with a second polarization characteristic, and the first rows and the second rows are arranged alternately (refer to FIGS. 3 and 4). Please refer to FIG. 8, in the embodiment, the 2D/3D polarized display device includes polarization 3D glasses 80, the polarization 3D glasses 80 include a left-eye polarized lens for receiving images displayed on the N first rows of the polarized display device and a right-eye polarized lens for receiving images displayed on the M second rows of the polarized display device. The 2D/3D polarized display device also includes an image reception module 81, a frequency doubling compensation processing module 82, a time domain control display module 83, a glasses control signal output module 84 and a glasses control signal reception module 85.

In the embodiment, the image reception module 81, which can also be called an image receiver, is configured to receive a frame of 3D image signals with a first frame frequency, wherein the 3D image signals include a left-eye image signal and a right-eye image signal.

The frequency doubling compensation processing module 82, which can also be called a frequency doubling compensation processor, is configured to perform frequency doubling to compensate the frame of 3D image signals with the first frame frequency, to generate a frame of compensated left-eye image signals with a second frame frequency and a frame of compensated right-eye image signals with the second frame frequency. In this case, the frame of compensated left-eye image signals include the left-eye image signal and a first image compensation signal, and the frame of compensated right-eye image signals include the right-eye image signal and a second image compensation signal. In this case, the frequency doubling processing on the 3D image signals by the frequency doubling compensation processing module 82 can be implemented for example by using a motion compensation processing chip (MEMC IC).

The frequency doubling compensation processing module 82 performs processing on data of the left-eye image signal and data of the right-eye image signal based on the formula $C1+C2+L+R=aL$ or $C1+C2+L+R=aR$, to obtain data of the first image compensation signal or data of the second image compensation signal, wherein L is display signal data corresponding to the ith pixel point of the left-eye image signal, and R is display signal data corresponding to the ith pixel point of the right-eye image signal; C1 is display signal data corresponding to the ith pixel point of the first image compensation signal, and C2 is display signal data corresponding to the ith pixel point of the second image compensation signal; and a is larger than 0, and i is a positive integer larger than or equal to 1.

When processing the data of the left-eye image signal and the data of the right-eye image signal based on the formula $C1+C2+L+R=aL$, the frequency doubling compensation processing module 82 can obtain the display signal data C1 corresponding to the ith pixel point of the first image compensation signal as $(a-2)L-R$, and the display signal data C2 corresponding to the ith pixel point of the second image compensation signal as L; or can obtain the display signal data C1 corresponding to the ith pixel point of the first image compensation signal as L, and the display signal data C2 corresponding to the ith pixel point of the second image compensation signal as $(a-2)L-R$. Preferably, when the frequency doubling compensation processing module 82 performs processing on the data of the left-eye image signal and the data of the right-eye image signal based on the formula $C1+C2+L+R=aL$, to obtain the data of the first image compensation signal or the data of the second image compensation signal, the display signal data C1 corresponding to the ith pixel point of the first image compensation signal and the display signal data C2 corresponding to the ith pixel point of the second image compensation signal are set to be the same, that is, it can be obtained that $C1=C2=((a-1)L-R)/2$. Certainly, other results of the data C1 and C2 can also be obtained from the formula $C1+C2+L+R=aL$, which is omitted herein. Furthermore, when the data of the left-eye image signal and the data of the right-eye image signal are processed based on the formula $C1+C2+L+R=aL$, the display cumulative effect of the left-eye compensation images based on the compensated left-eye image signals and the right-eye compensation images based on the compensated right-eye image signals is the display effect of the left-eye image.

When processing the data of the left-eye image signal and the data of the right-eye image signal based on the formula $C1+C2+L+R=aR$, the frequency doubling compensation processing module 82 can obtain the display signal data C1 corresponding to the ith pixel point of the first image compensation signal as $(a-2)R-L$, and the display signal data C2 corresponding to the ith pixel point of the second image compensation signal as R; or can obtain the display signal data C1 corresponding to the ith pixel point of the first image compensation signal as R, and the display signal data C2 corresponding to the ith pixel point of the second image compensation signal as $(a-2)R-L$. Preferably, when the frequency doubling compensation processing module 82 performs processing on the data of the left-eye image signal and the data of the right-eye image signal based on the formula $C1+C2+L+R=aR$, to obtain the data of the first image compensation signal or the data of the second image compensation signal, the display signal data C1 corresponding to the ith pixel point of the first image compensation signal and the display signal data C2 corresponding to the ith pixel point of the second image compensation signal are set to be the same, that is, it can be obtained that $C1=C2=((a-1)R-L)/2$. Certainly, other results of the data C1 and C2 can also be obtained from the formula $C1+C2+L+R=aL$, which is omitted herein. Furthermore, when the data of the left-eye image signal and the data of the right-eye image signal are processed based on the formula $C1+C2+L+R=aR$, the display cumulative effect of the left-eye compensation images based on the compensated left-eye image signals and the right-eye compensation images based on the compensated right-eye image signals is the display effect of the right-eye image.

Preferably, the frequency doubling compensation processing module 82 performs processing on the data of the left-eye image signal and the data of the right-eye image signal based on the formula $C1+C2+L+R=4L$ or $C1+C2+L+R=4R$, to obtain the data of the first image compensation signal or the data of the second image compensation signal.

When a is designed to be 4, the display cumulative effect of the left-eye compensation images and the right-eye compensation images is the effect of displaying 4 frames of images of the left-eye images or the right-eye images, that is to say, the frequency doubling compensation processing module 82 performs processing on the data of the left-eye image signal and the data of the right-eye image signal based on the formula $C1+C2+L+R=4L$, to obtain the data of the first image compensation signal or the data of the second image compensation signal, so that the display cumulative effect of the left-eye compensation images based on the compensated left-eye image signals and the right-eye compensation images based on the compensated right-eye image signals can be the display effect of 4 frames of left-eye images; and the frequency doubling compensation processing module 82 performs processing on the data of the left-eye image signal and the data of the right-eye image signal based on the formula C1+C2+L+R=4R, to obtain the data of the first image compensation signal or the data of the second image compensation signal, so that the display cumulative effect of the left-eye compensation images based on the compensated left-eye image signals and the right-eye compensation images based on the compensated right-eye image signals can be the display effect of 4 frames of right-eye images. The brightness of the display cumulative effect of the left-eye compensation images based on the compensated left-eye image signals and the right-eye compensation images based on the compensated right-eye image signals obtained on this condition does not need to be additionally compensated or regulated.

In the embodiment, the first frame frequency is 60 Hz, and the second frame frequency is 120 Hz; or the first frame frequency is 120 Hz, and the second frame frequency is 240 Hz; or the first frame frequency is 50 Hz, and the second frame frequency is 100 Hz; or the first frame frequency is 100 Hz, and the second frame frequency is 200 Hz, but the invention is not limited to it.

The time domain control display module 83 is configured to display on the polarized display device left-eye compensation images based on the compensated left-eye image signals during displaying a first frame image, wherein the left-eye image based on the left-eye image signal is displayed on the N first rows of the polarized display device, and the first compensation image based on the first image compensation signal is displayed on the M second rows of the polarized display device; and display on the polarized display device right-eye compensation images based on the compensated right-eye image signals during displaying a second frame image, wherein the second compensation image based on the second image compensation signal is displayed on the N first rows of the polarized display device, and the right-eye image based on the right-eye image signal is displayed on the M second rows of the polarized display device, wherein the display cumulative effect of the left-eye compensation images and the right-eye compensation images is the display effect of the left-eye image or the right-eye image.

The glasses control signal output module 84 is configured to transmit a first control signal to control the polarization 3D glasses to open the left-eye polarized lens and close the right-eye polarized lens during displaying the first frame image, and transmit a second control signal to control the polarization 3D glasses to close the left-eye polarized lens and open the right-eye polarized lens during displaying the second frame image.

Furthermore, it is to be noted that the content displayed during displaying the first frame image and that displayed during displaying the second frame image by the time domain control display module 83 can be exchanged, which can be achieved merely by correspondingly exchanging the switching time sequence of the polarization 3D glasses, that is to say, during displaying the first frame image, the right-eye compensation images based on the compensated right-eye image signals can be displayed on the polarized display device; and during displaying the second frame image, the left-eye compensation images based on the compensated left-eye image signals can be displayed on the polarized display device; and the glasses control signal output module 84 transmits a first control signal to control the polarization 3D glasses to close the left-eye polarized lens and open the right-eye polarized lens during displaying the first frame image, and transmits a second control signal to control the polarization 3D glasses to open the left-eye polarized lens and close the right-eye polarized lens during displaying the second frame image. The display cumulative effect of the left-eye compensation images and the right-eye compensation images still is the display effect of the left-eye image or the right-eye image.

The glasses control signal reception module 85 is disposed on the polarization 3D glasses 80 and is configured to receive the control signals output by the glasses control signal output module. The glasses control signal output module 84 and the glasses control signal reception module 85 can communicate with each other via a wireless signal, such as an infrared or Bluetooth signal.

Preferably, the polarization 3D glasses 80 can also include a liquid crystal shutter for opening or closing the left-eye polarized lens and the right-eye polarized lens according to a control signal received by the glasses control signal reception module. The liquid crystal shutter can be designed with reference to that in the existing shutter 3D glasses, and is omitted herein.

Compared with the prior art, in an embodiment of the invention, through compensation on the original left-eye and right-eye image signals and alternate time domain display of the images, and through compensating images in time and space, and in cooperation with control of the opening and closing of the polarization 3D glasses, while viewers wearing the polarization 3D glasses can experience a good 3D effect, other viewers with naked eyes can view clear 2D images, so that the 3D viewers and the 2D viewers do not affect each other.

Fourth Embodiment

Figure 9:
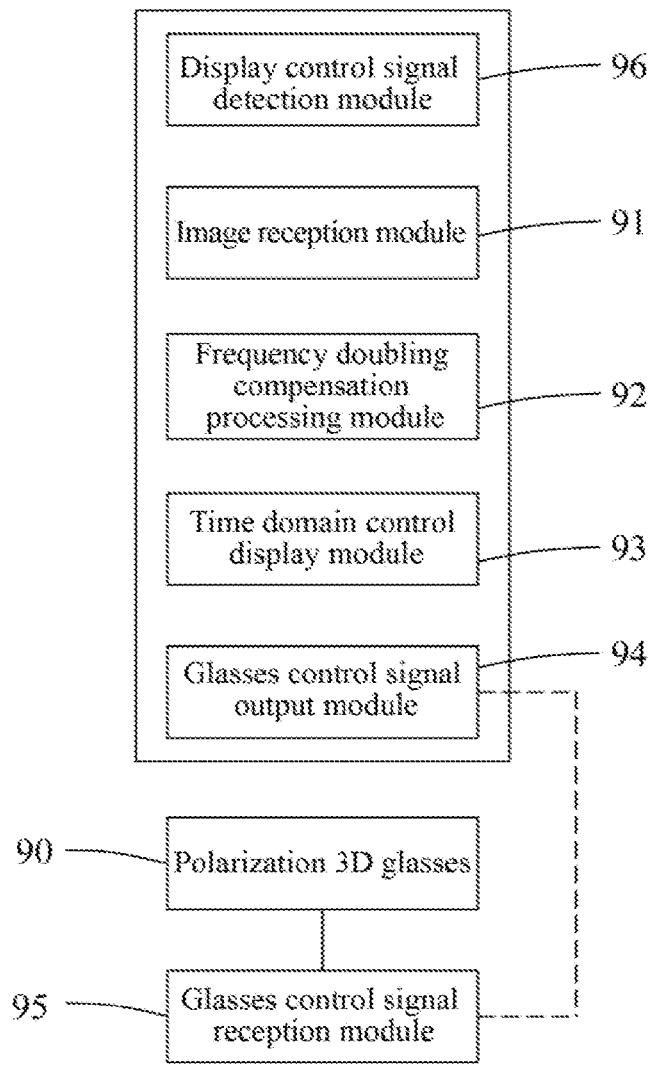
FIG. 9 is a structural schematic diagram of a 2D/3D polarized display device according to the fourth embodiment of the invention.

FIG. 9 is a structural schematic diagram of a 2D/3D polarized display device according to a fourth embodiment of the invention. Please refer to FIG. 9, in the embodiment, the 2D/3D polarized display device at least includes a 2D/3D simultaneous display mode and a 3D display mode, or the 2D/3D simultaneous display mode and a 2D display mode, or certainly can include the 3D display mode, the 2D/3D simultaneous display mode and the 2D display mode at the same time. The 2D/3D polarized display device includes polarization 3D glasses 90. The 2D/3D polarized display device also includes an image reception module 91, a frequency doubling compensation processing module 92, a time domain control display module 93, a glasses control signal output module 94 and a glasses control signal reception module 95. Different from the third embodiment, the 2D/3D polarized display device in the embodiment also includes a display control signal detection module 96 configured to monitor a display control signal, wherein the display control signal includes a 2D/3D simultaneous display mode signal, a 3D display mode signal or a 2D display mode signal. If the monitored display control signal is the 2D/3D simultaneous display mode signal, the frequency doubling compensation processing module 92, the time domain control display module 93 and the glasses control signal output module 94 all work as those corresponding modules in the third embodiment.

If the display control signal monitored by the display control signal detection module 96 is the 3D display mode signal, the image reception module 91 receives a frame of 3D image signals with a first frame frequency; and the frequency doubling compensation processing module 92 performs frequency doubling to compensate the frame of 3D image signals with the first frame frequency, to generate a frame of the 3D image signals with a second frame frequency and a frame of 3D image compensation signals with the second frame frequency, wherein the 3D image compensation signals replicate the 3D image signals or are MEMC compensation signals of the 3D image signals. The time domain control display module 93 displays the 3D image signals during displaying the first frame image, and controls the N first rows of the polarized display device to display the left-eye image based on the 3D image signals, and the M second rows of the polarized display device to display the right-eye image based on the 3D image signals; and displays the 3D image compensation signals during displaying the second frame image, and controls the N first rows of the polarized display device to display the left-eye image based on the 3D image compensation signals, and the M second rows of the polarized display device to display the right-eye image based on the 3D image compensation signals. The glasses control signal output module 94 controls both the left-eye polarized lens and the right-eye polarized lens of the polarization 3D glasses to open, both during displaying the first frame image and during displaying the second frame image.

If the display control signal monitored by the display control signal detection module 96 is the 2D display mode signal, the image reception module 91 receives a frame of 2D image signals with a first frame frequency; and the frequency doubling compensation processing module 92 performs frequency doubling to compensate the frame of 2D image signals with the first frame frequency, to generate a frame of the 2D image signals with a second frame frequency and a frame of 2D image compensation signals with the second frame frequency, wherein the 2D image compensation signals are replicates of the 2D image signals or are MEMC compensation signals of the 2D image signals. The time domain control display module 93 displays 2D images based on the 2D image signals during displaying the first frame image, and displays the 2D compensation images based on the 2D image compensation signals during displaying the second frame image.

Fifth Embodiment

Figure 10:
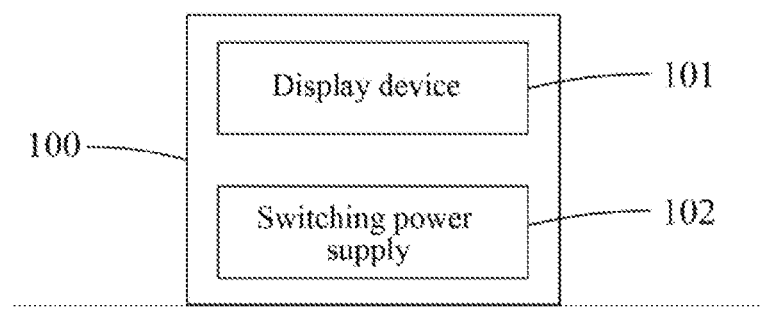
FIG. 10 is a structural schematic diagram of a 2D/3D television according to the fifth embodiment of the invention.

FIG. 10 is a structural schematic diagram of a 2D/3D television according to a fifth embodiment of the invention. Please refer to FIG. 10, in the embodiment, the 2D/3D television 100 includes a display device 101 and a switching power supply 102, and the display device 101 is the 2D/3D polarized display device in the above embodiments, the structure of which is omitted herein.

In summary, the 2D/3D polarized display method and polarized display device provided by the embodiments of the invention have the following advantages.

Firstly, according to the invention, frequency doubling processing is performed on the 3D image signals including the left-eye image signal and the right-eye image signal, to generate the second image signals with the second frame frequency, wherein the second image signals include the compensated left-eye image signals and the compensated right-eye image signals, the compensated left-eye image signals include the left-eye image signal and the first image compensation signal, and the compensated right-eye image signals include the right-eye image signal and the second image compensation signal. During displaying the first frame image, the left-eye image based on the left-eye image signal and the first compensation image based on the first image compensation signal are displayed in an interlaced manner; and during displaying the second frame image, the second compensation image based on the second image compensation signal and the right-eye image based on the right-eye image signal are displayed in an interlaced manner, and the display cumulative effect of the left-eye compensation images and the right-eye compensation images is the display effect of the left-eye image or the right-eye image. When a user is viewing with the polarization 3D glasses, in a time period when the left-eye compensation images are displayed, the left-eye polarized lens of the 3D glasses is open and receives the left-eye image, and the right-eye polarized lens is closed and shields the first compensation image; and in a time period when the right-eye compensation images are displayed, the left-eye polarized lens of the 3D glasses is closed and shields the second compensation image, and the right-eye polarized lens is open and receives the right-eye image; and the 3D glasses receive the left-eye image and the right-eye image alternately, thereby forming a 3D image in the brain. When not wearing the 3D glasses, the user can see cumulative effect of continuous images, and according to the invention, the display cumulative effect of the left-eye compensation images and the right-eye compensation images is the display effect of the left-eye image or the right-eye image, and thus the display effect the user can see is continuous picture effect of the left-eye images or the right-eye images, which solves the double-image phenomenon resulting from the alternate accumulative effect of the left-eye images and the right-eye images in the prior art, and produces a good 2D image display effect.

Secondly, since it is achieved in the invention that when the user is not wearing the 3D glasses, the display effect he can see is continuous picture effect of the left-eye images or the right-eye images, and the double-image phenomenon is avoided and a good 2D image display effect is realized, then the technical problem that user can see the double-image phenomenon when viewing with naked eyes is solved, and 2D and 3D simultaneous compatible display is realized, and the object that different users and groups can view 2D and 3D images at the same time is achieved.

Thirdly, since 2D and 3D simultaneous compatible display is achieved in the invention, with respect to the same viewing user, changing between 3D and 2D can be conducted at will, and thus switching between 3D and 2D display modes is avoided, for example, when a user feels tired after viewing the 3D pictures for a long time, he can take off the 3D glasses and view the 2D pictures directly.

It is to be noted that all the embodiments are described in a progressive way in the description, and the focal points of the description of each embodiment are different from other embodiments, and thus like or similar parts in the embodiments can be referred to each other. As to the embodiments regarding the devices, since such embodiments are substantially similar to the embodiments regarding the method, the description is relatively simple, and for relevant points, part of the description of the embodiments regarding the method can be referred to.

It is to be noted that relation terms, such as first, second and the like used herein are only for differentiating one entity or operation from another entity or operation, and it does not necessarily require or imply that any such actual relation or sequence exists between these entities or operations. Moreover, the terms "include" or any other variations are intended to cover non-exclusive inclusions, so that processes, methods, articles or devices including a series of elements not only include such elements, but also include other elements that are not explicitly listed, or also include inherent elements of such processes, methods, articles or devices. Without more limitations, an element defined by the expression "includes a . . . " does not exclude the possibility of other like elements existing in the processes, methods, articles or devices which includes the element.

The above is only embodiments of the invention, and does not limit the invention in any form; the invention is already disclosed above in the embodiments, but it is not intended to limit the invention; and slight alterations or modifications can be made without departing from the scope of the technical solution of the invention by those skilled in the art by using the technical content disclosed above to generate equivalent embodiments with equivalent changes, but any simple amendment, equivalent change and modification made to the above embodiments according to the technical substance of the invention without departing from the content of the technical solution of the invention still falls into the scope of the technical solution of the invention.

The invention claimed is:

1. A 2D/3D polarized display method for a 2D/3D polarized display device, wherein the polarized display device comprises N first rows with a first polarization characteristic and M second rows with a second polarization characteristic, and the first rows and the second rows are arranged alternately, the polarized display device further comprises polarization 3D glasses, the polarization 3D glasses comprise a left-eye polarized lens for receiving images displayed on the N first rows of the polarized display device and a right-eye polarized lens for receiving images displayed on the M second rows of the polarized display device, wherein N and M are nature number, the method comprises:

receiving a frame of 3D image signals with a first frame frequency, wherein the 3D image signals include a left-eye image signal and a right-eye image signal;

performing frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal;

during displaying a first frame image, displaying on the polarized display device left-eye compensation images based on the compensated left-eye image signals, wherein a left-eye image based on the left-eye image signal is displayed on the N first rows of the polarized display device, and a first compensation image based on the first image compensation signal is displayed on the M second rows of the polarized display device; and controlling the polarization 3D glasses to open the left-eye polarized lens and close the right-eye polarized lens; and during displaying a second frame image, displaying on the polarized display device right-eye compensation images based on the compensated right-eye image signals, wherein a second compensation image based on the second image compensation signal is displayed on the N first rows of the polarized display device, and a right-eye image based on the right-eye image signal is displayed on the M second rows of the polarized display device; and controlling the polarization 3D glasses to close the left-eye polarized lens and open the right-eye polarized lens, wherein, the display cumulative effect of the left-eye compensation images and the right-eye compensation images is the display effect of the left-eye image or the right-eye image.

2. The 2D/3D polarized display method according to claim 1, wherein the step of performing frequency doubling to compensate the frame of 3D image signals with the first frame frequency, to generate the frame of compensated left-eye image signals with the second frame frequency and the frame of compensated right-eye image signals with the second frame frequency comprises:

obtaining the first image compensation signal included in the compensated left-eye image signals and the second image compensation signal included in the compensated right-eye image signals, according to the left-eye image signal and the right-eye image signal.

3. The 2D/3D polarized display method according to claim 2, wherein the step of obtaining the first image compensation signal included in the compensated left-eye image signals and the second image compensation signal included in the compensated right-eye image signals, according to the left-eye image signal and the right-eye image signal comprises:

processing data of the left-eye image signal and data of the right-eye image signal based on the formula $C1+C2+L+R=aL$ or $C1+C2+L+R=aR$, to obtain data of the first image compensation signal or data of the second image compensation signal, wherein L is display signal data corresponding to the ith pixel point of the left-eye image signal, and R is display signal data corresponding to the ith pixel point of the right-eye image signal; C1 is display signal data corresponding to the ith pixel point of the first image compensation signal, and C2 is display signal data corresponding to the ith pixel point of the second image compensation signal; and a is larger than 0, and i is a positive integer larger than or equal to 1.

4. The 2D/3D polarized display method according to claim 3, wherein the step of processing the data of the left-eye image signal and the data of the right-eye image signal based on the formula $C1+C2+L+R=aL$ or $C1+C2+L+R=aR$, to obtain the data of the first image compensation signal or the data of the second image compensation signal further comprises:

setting the display signal data C1 corresponding to the ith pixel point of the first image compensation signal and the display signal data C2 corresponding to the ith pixel point of the second image compensation signal to be the same, and processing the data of the left-eye image signal and the data of the right-eye image signal, to obtain the data of the first image compensation signal or the data of the second image compensation signal, i.e., the formula is $C1=C2=((a-1)L-R)/2$ or $C1=C2=((a-1)R-L)/2$.

5. The 2D/3D polarized display method according to claim 3, wherein the display cumulative effect of the left-eye compensation images and the right-eye compensation images is the effect of displaying 4 frames of images of the left-eye image or the right-eye image.

6. The 2D/3D polarized display method according to claim 5, wherein the step of processing the data of the left-eye image signal and the data of the right-eye image signal based on the formula $C1+C2+L+R=aL$ or $C1+C2+L+R=aR$, to obtain the data of the first image compensation signal and the data of the second image compensation signal comprises:

processing the data of the left-eye image signal and the data of the right-eye image signal based on the formula $C1+C2+L+R=4L$ or $C1+C2+L+R=4R$, to obtain the data of the first image compensation signal or the data of the second image compensation signal.

7. The 2D/3D polarized display method according to claim 1, further comprising:

the N first rows correspond to odd rows of the polarized display device, and the M second rows correspond to even rows of the polarized display device, wherein the step of during displaying the first frame image, displaying on the polarized display device left-eye compensation images based on the compensated left-eye image signals, wherein the left-eye image based on the left-eye image signal is displayed on the N first rows of the polarized display device, and the first compensation image based on the first image compensation signal is displayed on the M second rows of the polarized display device comprises:
during displaying the first frame image, displaying the left-eye image on the odd rows of the polarized display device, and displaying the first compensation image on the even rows of the polarized display device; and
the step of during displaying the second frame image, displaying on the polarized display device the right-eye compensation images based on the compensated right-eye image signals, wherein the second compensation image based on the second image compensation signal is displayed on the N first rows of the polarized display device, and the right-eye image based on the right-eye image signal is displayed on the M second rows of the polarized display device comprises:
during displaying the second frame image, displaying the second compensation image on the odd rows of the polarized display device, and displaying the right-eye image on the even rows of the polarized display device.

8. The 2D/3D polarized display method according to claim 1, further comprising:
the N first rows correspond to the even rows of the polarized display device, and the M second rows correspond to the odd rows of the polarized display device,
wherein the step of during displaying the first frame image, displaying on the polarized display device the left-eye compensation images based on the compensated left-eye image signals, wherein the left-eye image based on the left-eye image signal is displayed on the N first rows of the polarized display device, and the first compensation image based on the first image compensation signal is displayed on the M second rows of the polarized display device comprises:
during displaying the first frame image, displaying the first compensation image on the odd rows of the polarized display device, and displaying the left-eye image on the even rows of the polarized display device; and
the step of during displaying the second frame image, displaying on the polarized display device the right-eye compensation images based on the compensated right-eye image signals, wherein the second compensation image based on the second image compensation signal is displayed on the N first rows of the polarized display device, and the right-eye image based on the right-eye image signal is displayed on the M second rows of the polarized display device comprises:
during displaying the second frame image, displaying the right-eye image on the odd rows of the polarized display device, and displaying the second compensation image on the even rows of the polarized display device.

9. The 2D/3D polarized display method according to claim 1, before the step of receiving the frame of 3D image signals with the first frame frequency, the method further comprises:
monitoring a display control signal, wherein the display control signal includes a 2D/3D simultaneous display mode signal or a 3D display mode signal;
if the monitored display control signal is the 2D/3D simultaneous display mode signal, then performing the steps according to claim 1; and
if the monitored display control signal is the 3D display mode signal, then performing the following steps:
receiving a frame of 3D image signals with a first frame frequency, wherein the 3D image signals include a left-eye image signal and a right-eye image signal;
performing frequency doubling to compensate the frame of 3D image signals with the first frame frequency, to generate a frame of the 3D image signals with a second frame frequency and a frame of 3D image compensation signals with the second frame frequency, wherein the 3D image compensation signals replicate the 3D image signals or are MEMC compensation signals of the 3D image signals;
during displaying a first frame image, displaying the 3D image signals on the polarized display device, wherein a left-eye image based on the 3D image signals is displayed on the N first rows of the polarized display device, and a right-eye image based on the 3D image signals is displayed on the M second rows of the polarized display device; and
during displaying a second frame image, displaying the 3D image compensation signals on the polarized display device, wherein the left-eye image based on the 3D image compensation signals is displayed on the N first rows of the polarized display device, and the right-eye image based on the 3D image compensation signals is displayed on the M second rows of the polarized display device,
wherein during displaying the first frame image and the second frame image, the left-eye polarized lens and the right-eye polarized lens of the polarization 3D glasses are both open.

10. The 2D/3D polarized display method according to claim 1, before the step of receiving the frame of 3D image signals with the first frame frequency, the method further comprises the following steps:
monitoring a display control signal, wherein the display control signal includes a 2D/3D simultaneous display mode signal or a 2D display mode signal;
if the monitored display control signal is the 2D/3D simultaneous display mode signal, then performing the steps according to claim 1; and
if the monitored display control signal is the 2D display mode signal, then performing the following steps:
receiving a frame of 2D image signals with a first frame frequency;
performing frequency doubling to compensate the frame of 2D image signals with the first frame frequency, to generate a frame of the 2D image signals with a second frame frequency and a frame of 2D image compensation signals with the second frame frequency, wherein the 2D image compensation signals are replicates of the 2D image signals or are MEMC compensation signals of the 2D image signals; and
during displaying a first frame image, displaying 2D images based on the 2D image signals, and during displaying a second frame image, displaying 2D compensation images based on the 2D image compensation signals.

11. A 2D/3D polarized display device, comprising N first rows with a first polarization characteristic and M second rows with a second polarization characteristic, and the first rows and the second rows are arranged alternately, the polarized display device further comprises polarization 3D glasses, the polarization 3D glasses comprise a left-eye polarized lens for receiving images displayed on the N first rows of the polarized display device and a right-eye polarized lens for receiving images displayed on the M second rows of the polarized display device, wherein N and M are nature number, the 2D/3D polarized display device further comprises:
an image reception module configured to receive a frame of 3D image signals with a first frame frequency, wherein the 3D image signals include a left-eye image signal and a right-eye image signal;

a frequency doubling compensation processing module configured to perform frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal;

a time domain control display module configured to display on the polarized display device left-eye compensation images based on the compensated left-eye image signals during displaying a first frame image, wherein a left-eye image based on the left-eye image signal is displayed on the N first rows of the polarized display device, and a first compensation image based on the first image compensation signal is displayed on the M second rows of the polarized display device; and to display on the polarized display device the right-eye compensation images based on the compensated right-eye image signals during displaying a second frame image, wherein a second compensation image based on the second image compensation signal is displayed on the N first rows of the polarized display device, and a right-eye image based on the right-eye image signal is displayed on the M second rows of the polarized display device, wherein the display cumulative effect of the left-eye compensation images and the right-eye compensation images is the display effect of the left-eye image or the right-eye image;

a glasses control signal output module configured to transmit a first control signal to control the polarization 3D glasses to open the left-eye polarized lens and close the right-eye polarized lens during displaying the first frame image, and to transmit a second control signal to control the polarization 3D glasses to close the left-eye polarized lens and open the right-eye polarized lens during displaying the second frame image; and a glasses control signal reception module, disposed on the polarization 3D glasses, and configured to receive the control signals output by the glasses control signal output module.

12. The 2D/3D polarized display device according to claim 11, further comprising: a liquid crystal shutter configured to open or close the left-eye polarized lens and the right-eye polarized lens according to the control signal received by the glasses control signal reception module.

13. The 2D/3D polarized display device according to claim 11, wherein the frequency doubling compensation processing module is configured to obtain the first image compensation signal included in the compensated left-eye image signals and the second image compensation signal included in the compensated right-eye image signals, according to the left-eye image signal and the right-eye image signal.

14. The 2D/3D polarized display device according to claim 13, wherein the frequency doubling compensation processing module is configured to process data of the left-eye image signal and data of the right-eye image signal based on the formula $C1+C2+L+R=aL$ or $C1+C2+L+R=aR$, to obtain data of the first image compensation signal or data of the second image compensation signal, wherein L is display signal data corresponding to the ith pixel point of the left-eye image signal, and R is display signal data corresponding to the ith pixel point of the right-eye image signal; C1 is display signal data corresponding to the ith pixel point of the first image compensation signal, and C2 is display signal data corresponding to the ith pixel point of the second image compensation signal; and a is larger than 0, and i is a positive integer larger than or equal to 1.

15. The 2D/3D polarized display device according to claim 14, wherein when the frequency doubling compensation processing module processes the data of the left-eye image signal and the data of the right-eye image signal based on the formula $C1+C2+L+R=aL$ or $C1+C2+L+R=aR$, to obtain the data of the first image compensation signal or the data of the second image compensation signal, the display signal data C1 corresponding to the ith pixel point of the first image compensation signal and the display signal data C2 corresponding to the ith pixel point of the second image compensation signal are set to be the same, i.e., the formula is $C1=C2=((a-1)L-R)/2$ or $C1=C2=((a-1)R-L)/2$.

16. The 2D/3D polarized display device according to claim 14, wherein the frequency doubling compensation processing module is configured to process the data of the left-eye image signal and the data of the right-eye image signal based on the formula $C1+C2+L+R=4L$ or $C1+C2+L+R=4R$, to obtain the data of the first image compensation signal or the data of the second image compensation signal.

17. The 2D/3D polarized display device according to claim 11, wherein
the N first rows correspond to the odd rows of the polarized display device, and the M second rows correspond to the even rows of the polarized display device; and
the time domain control display module is configured to control the odd rows of the polarized display device to display the left-eye image and the even rows of the polarized display device to display the first compensation image during displaying the first frame image; and to control the odd rows of the polarized display device to display the second compensation image and the even rows of the polarized display device to display the right-eye image during displaying the second frame image.

18. The 2D/3D polarized display device according to claim 11, wherein
the N first rows correspond to the even rows of the polarized display device, and the M second rows correspond to the odd rows of the polarized display device; and
the time domain control display module is configured to control the odd rows of the polarized display device to display the first compensation image and the even rows of the polarized display device to display the left-eye image during displaying the first frame image; and to control the odd rows of the polarized display device to display the right-eye image and the even rows of the polarized display device to display the second compensation image during displaying the second frame image.

19. A non-transitory computer readable medium having instructions stored thereon, which when executed, by at least one processing circuit, causes the at least one processing circuit to:
receive a frame of 3D image signals with a first frame frequency, wherein the 3D image signals include a left-eye image signal and a right-eye image signal;
perform frequency doubling to compensate the frame of 3D image signals with the first frame frequency, to generate a frame of compensated left-eye image signals with a second frame frequency and a frame of compensated right-eye image signals with the second frame frequency, wherein the frame of compensated left-eye image signals include the left-eye image signal and a first image compensation signal, and the frame of compensated right-eye image signals include the right-eye image signal and a second image compensation signal;

during displaying a first frame image, display on a polarized display device left-eye compensation images based on the compensated left-eye image signals, wherein a left-eye image based on the left-eye image signal is displayed on N first rows of the polarized display device, and a first compensation image based on the first image compensation signal is displayed on M second rows of the polarized display device; and control polarization 3D glasses to open a left-eye polarized lens and close a right-eye polarized lens; and during displaying a second frame image, display on the polarized display device right-eye compensation images based on the compensated right-eye image signals, wherein a second compensation image based on the second image compensation signal is displayed on the N first rows of the polarized display device, and a right-eye image based on the right-eye image signal is displayed on the M second rows of the polarized display device; and control the polarization 3D glasses to close the left-eye polarized lens and open the right-eye polarized lens, wherein, the display cumulative effect of the left-eye compensation images and the right-eye compensation images is the display effect of the left-eye image or the right-eye image; and wherein the polarized display device comprises the N first rows with a first polarization characteristic and the M second rows with a second polarization characteristic, and the first rows and the second rows are arranged alternately, the polarized display device further comprises the polarization 3D glasses, the polarization 3D glasses comprise the left-eye polarized lens for receiving images displayed on the N first rows of the polarized display device and the right-eye polarized lens for receiving images displayed on the M second rows of the polarized display device, wherein N and M are nature number.

* * * * *